APPARATUS FOR MAKING A WOVEN WIRE MEMORY

Filed Oct. 10, 1966 2 Sheets-Sheet 1

INVENTORS
ROY M. DIMON
ROBERT R. WILLIAMSON
BY [signature]
ATTORNEY

APPARATUS FOR MAKING A WOVEN WIRE MEMORY

Filed Oct. 10, 1966 2 Sheets-Sheet 2

*INVENTORS*
ROY M. DIMON
ROBERT R. WILLIAMSON
*BY* Joseph Dwyer
*ATTORNEY*

United States Patent Office 3,488,695
Patented Jan. 6, 1970

3,488,695

APPARATUS FOR MAKING A WOVEN WIRE MEMORY

Roy M. Dimon, Sylmar, and Robert R. Williamson, Carlsbad, Calif., assignors to Singer-General Precision, Inc., a corporation of Delaware Filed Oct. 10, 1966, Ser. No. 585,348
Int. Cl. B23k *1/08;* H01f *7/06*
U.S. Cl. 228—5 5 Claims

ABSTRACT OF THE DISCLOSURE

This disclosure relates to an apparatus for electrically interconnecting insulated wires in a weaving loom to form a memory for a computer. The apparatus includes a selecting means, a gathering means, means for moving the selected wires into the gathering means, means for removing insulation and means for interconnecting the stripped portions of the selected wires.

This invention relates to a method and apparatus for interconnecting wires of a woven type matrix for the memory of a computer, and more particularly to a novel and improved method and apparatus for selecting, gathering and interconnecting certain strands of wires making up the matrix in a predetermined manner necesssary in the formation of and the proper operation of woven plated wire memory matrices.

In the manufacture of woven plated wire memory matrices, or the like, wires previously plated with a thin film magnetic coating, are actually interwoven (with the plated wire as the woof) with insulated unplated wires (as the warp) into a clothlike array or pattern. The magnetically plated wires have a circumferential direction of magnetization by reason of having been plated in the presence of a circumferentially oriented magnetic field, such as created by passing a current through the wire during the plating operation. In such a memory matrix, a plurality of these plated wires are coupled at intervals along their lengths by means of induction coils formed by the warp wires to apply a magnetic field to the plated wires so that a bit of information may be stored in the cylindrical incremental volume or ring of the magnetic film occurring at the intersection of the plated wire and the induction coil. Thus, a single plated wire is divided into a plurality of bi-stable magnetic memory elements.

When it is desired to write bits into these memory elements, application of current through the coils (word current) of the selected insulated wires (or word lines) will rotate the magnetization in the selected cylindrical incremental volumes of the plated thin film in the plated wires from the "easy," or circumferential direction, toward the "hard," or axial, direction. A simultaneously applied current in the selected plated wire (digit current) will tilt the magnetization vector away from the hard, or axial, direction and when the word current is removed, the magnetization vector will rotate to the easy axis of magnetization determined by the polarity of the digit current. The two binary storage states, therefore, consist of two possible directions of the easy axis of magnetization with the selection made by the tilting effect of the digit current which is removed last. Only that bit operation in that incremental volume of plated wire where the word current and the digit current coincide is affected by this operation. This rotation of the magnetic vector has also sometimes been described as causing a complete change of state of a bistable memory element, and the orientation of the vector of magnetization in one direction or the other has been described as its quiescent states.

The memory array may be interrogated by pulsing the word lines (insulated wires) with a suitable current. Besides serving as a storage medium and a digit line, the plated wire also functions as a sense line. The pulsing of a word line rotates the magnetization in the plated wire towards the hard axis, thereby inducing a voltage in the plated wire (sense line). The polarity of this sense voltage depends on whether the original easy axis of magnetization was clockwise or counterclockwise and will represent the storage of either a binary "1" or a binary "0."

Either nondestructive readout or destructive readout operations are possible with plated wire memories. In the former, the magnetization vector rotation is limited so it falls back to its original orientation or quiescent state upon the conclusion of an interrogation pulse and is sometimes referred to as a partial change of state of the bistable memory element as distinguished from the so-called complete change of state discussed above. In a destructive readout operation, higher interrogate pulse amplitudes are used so that there is a complete change of state of the bistable memory element. Thus, to write or to read information on the plated wire, a plurality of turns of the insulated wires are required so as to produce a coil with the proper amount of flux at the intersection of these plated and unplated wires. When conventional weaving techniques are to be used to form the woven plated wire memory, the number of turns of the insulated wires to provide such a coil is accomplished by connecting the ends of the unplated wires, making a plurality of strands essentially a single wire while leaving other unplated wires as spacers between the coils along the plated wires.

This interconnection is formed at the periphery of the matrix, and heretofore in the manufacture of such matrices, this interconnection has been a hand operation in which the operator would select each strand of wire to be interconnected with another and then hand solder the wires after having removed the insulation and prepared the strands for soldering. This hand technique is further complicated by the fact that some wires are connected to form bucking coils in the matrix and others simply form spacers between the magnetic elements, all of which makes the hand operation difficult. Thus, in view of the care necessary to insure a proper connection of the selected strands, it can be appreciated that such a hand operation is costly, time consuming, and involves a high probability of error.

Accordingly, the present invention provides a technique for connecting the insulated word lines, or wires, which is faster, less expensive, and does so with less chance of error.

Briefly described, this invention comprises a method and apparatus for interconnecting certain selected strands of unplated wires, or word lines, and separating them from other insulated wires used in the formation of a memory plane while the wires are held in the loom utilized in performing the weaving operation. The heddles of the loom perform the separating operation by displacing the preselected strands of wires from the other unselected strands of wires while at the same time holding the latter in place so that the preselected strands may be gathered by a gathering comb for interconnection. Means are provided for removing the insulation from the wires; then while gathered and held, both by the conventional heddles and the gathering comb, means are provided for suitably interconnecting the already stripped wires. This connecting means, for the purpose of this disclosure, comprises a soldering technique and mechanism.

Thus, as is apparent, one advantage of the present invention is that the desired result of connecting the selected wires for a woven memory matrix is accomplished by utilizing the already available heddles of a weaving machine.

Another feature of the invention, as will be apparent from a more detailed description hereinafter, is a provision of a means for properly and adequately connecting the wires by soldering as they are held in place by the gathering comb and the heddles of a weaving machine.

Other additional advantages and features of the present invention will become apparent to those skilled in the art after having read and understood the following description taken in connection with the attached drawings, wherein.

Figure 1:
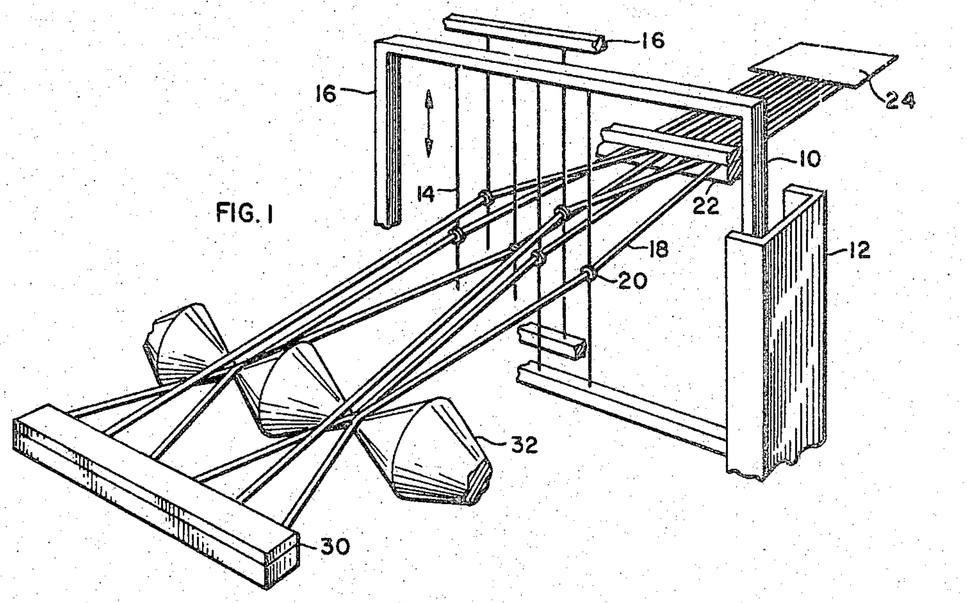
FIGURE 1 is a schematic perspective view showing the strands of wire in loom heddles so that the strands are moved out of the planar position while the other wires are gathered by the gathering comb; the slope of the walls of the gathering comb in this view being exaggerated to illustrate their function more clearly.

Turning now to a more detailed description of this invention and with reference to the drawings, it can be seen that the loom illustrated therein and designated in its entirety as 10 is of the Jacquard type having a frame schematically illustrated as 12 with a plurality of heddles 14 connected to parallel vertically movable harness bars 16, each of which move a plurality of heddles vertically with respect to the frame 12. A plurality of strands of the unplated insulated wires 18 which will form the word wires are threaded through the eyes 20 of the heddles so that these strands will be moved relative to one another as warp strands in accordance with conventional weaving techniques to form a clothlike array of any selected pattern. In practice, every other wire is moved relative to its adjacent wire to ultimately accommodate the plated magnetic wire which is extended transversely through the separated wires similar to the way in which the woof strand of fabric is threaded and held in the conventional weaving technique. Once the woof is in place, the heddles are moved so that the wires which were in the lower position, such as shown in FIGURE 1, will be moved to the upper position, and vice versa, so that the woof wire may be inserted in a manner similar to the woof strand of fabric and a suitable comb (not shown) moves the last woven woof wire closer to the previously woven woof wires in a manner similar to conventional cloth weaving and to permanently stress the warp wire and form loops therein. It can be appreciated that the warp strands of unplated wire forming a loop has the advantage that the magnetically plated wire may be replaced, if necessary, without having to recut or reweave the completed memory matrices. This factor contributes materially to manufacturing economy and high quality of the woven type memory planes.

Figure 3:
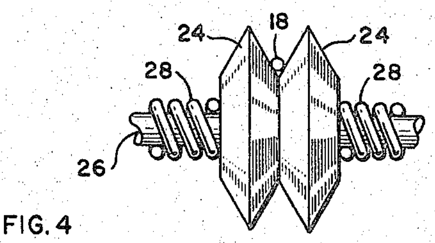
FIGURE 3 is a schematic illustration of the clutch mechanism for the strands of wires.

In order to permit relative movement of the unplated warp wires in the heddles 14 a suitable clutch mechanism is necessary since the warp wires differ from conventional weaving fabric by not having as much elasticity and this clutch mechanism as illustrated schematically in FIGURE 3 comprises a plurality of discs 24 tapered at their peripheries and mounted on a rod 26 to permit relative movement of the strands 18. Spring 28 urges the discs 24 toward one another to permit the yielding movement between the discs so that the wires 18 will not be unduly stretched as they are moved by the heddles 14.

To move the warp wires 18 along while performing the weaving operation, a suitable means is provided for clamping the wires which in the embodiment disclosed comprises a pair of clamping bars 30. These bars hold the wires in a planar fashion as the heddles move to the other increments of the selected strands of wires during the weaving operation, as shown more clearly in FIGURE 2. Suitable means are also provided, but not shown since it forms a conventional part of a Jacquard loom, for moving the clamping means relative to the heddles.

As hereinabove mentioned, an important aspect of the present invention is a means for interconnecting selected strands of the warp wires to form the requisite number of turns around the plated wires for the provision of suitable magnetic flux to read or write on the plated magnetic wire and to provide other suitable weaving patterns, such as buckling transformers to prevent creep between the magnetic bi-stable memory elements along the plated wire, and this aspect of the invention will now be described.

Figure 4:
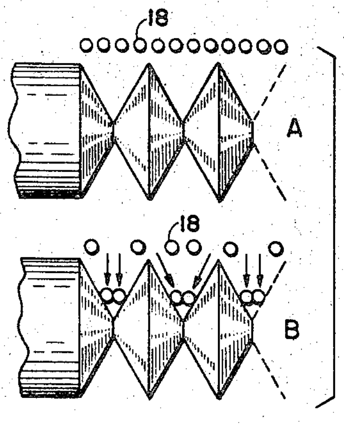
FIGURE 4 is a schematic end view of the wires and illustrating to advantage the disposition of the selected strands in the gathering comb for the interconnecting operation.

As set forth in FIGURE 1, there is shown a gathering comb indicated in its entirety as 32 and comprises a plurality of cones horizontally oriented to present inclined surfaces, i.e., notches to the planar oriented warp wires. Thus, as shown in FIGURE 4, the warp wires 18 are disposed in a planar fashion but with the cooperation of the heddles 14 and the relative movement between the gathering comb 32 and the clamping means 30, certain selected strands can be gathered and joined together. Obviously, the selection of the particular strands is accomplished by the selection of the heddles to be moved and the relative motion between heddles and the clamping means and the gathering comb.

Figure 2:
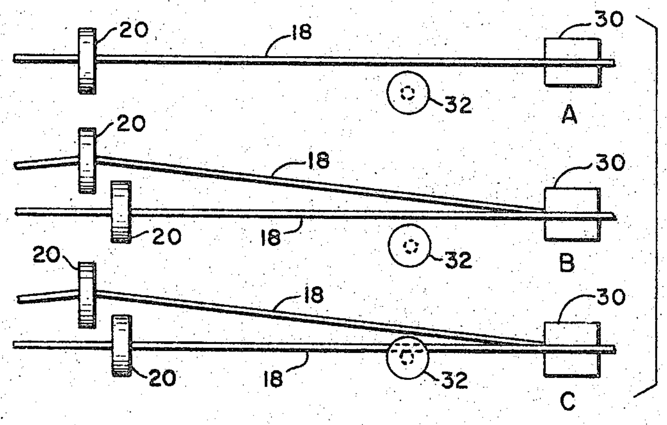
FIGURE 2 illustrates schematically the relative movement of the wires with respect to the gathering comb and heddles.

As more clearly shown in FIGURES 2 and 4, the gathering comb 32 is moved relative to the clamping means 30 while at the same time the eyes 20 of the heddles 18 are displaced relative to each other so that the normally planar configuration of the warp wires 18 as shown in FIGURE 4A is disturbed and the selected wires are brought to the base of the notches in the gathering comb in contiguous relationship as clearly shown in FIGURE 4B. In that position, the contiguous strands may be connected. It should be noted that for the purposes of this disclosure the gathering comb is moved and the clamping means 30 is held stationary, but this operation could be reversed. The important aspect is the relative movement between the two so that the gathering comb, clamping means, and heddles can perform their functions mutually.

Figure 5:
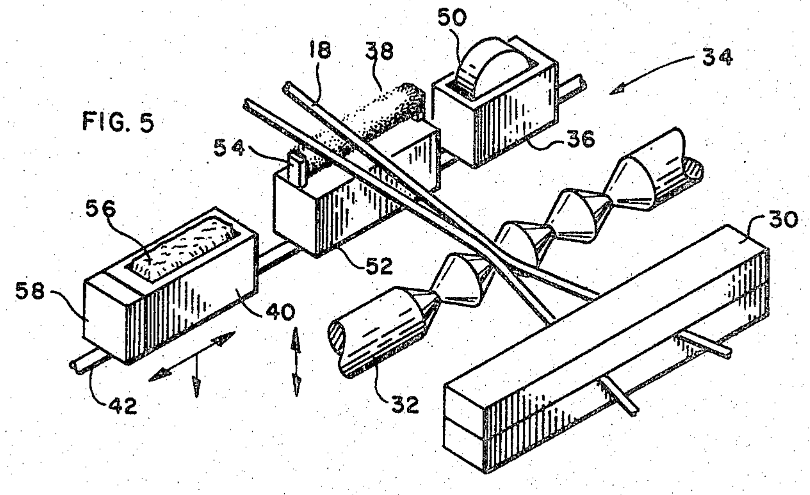
FIGURE 5 is a perspective schematic view of the interconnecting operation and the means to accomplish the same.
Figure 6:
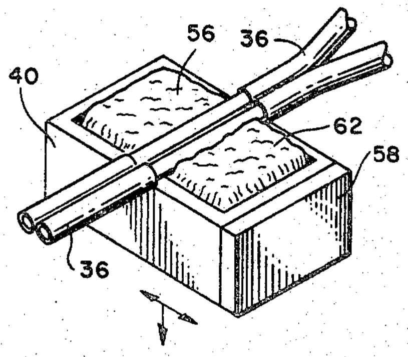
FIGURE 6 illustrates schematically a novel soldering apparatus and technique for properly connecting the wires.

While in such a gathered position the selected wires are suitably interconnected and this operation is more clearly shown in FIGURES 5 and 6 of the drawings to which specific reference should be made.

Turning now to these FIGURES 5 and 6, it can be seen that the gathering comb 32 is holding two warp wires in contiguous relationship and two are illustrated simply for the purpose of describing the interconnection operation.

Bearing in mind that the warp wires are the insulated wires, means must be provided for removing the insulation and properly connecting the warp wires together.

Immediately preceding the gathering comb 32, between the heddles 14 and the clamping means 30, there is provided a soldering means, indicated in its entirety as 34, and which comprises three elements: first, a container or receptacle 36 for a suitable solvent for softening the wire insulation; second, a brush 38; and finally, a container 40 for solder; all of which are mounted on any suitable device for moving the three elements so as to perform their respective functions. In the embodiment shown, for purposes of disclosing this invention, the three connecting elements are mounted on a rod 42 which moves transversely of all of the wires so that first, the solvent is applied to the insulation; secondly, the brush contacts the dissolved insulation to perfect its removal; and finally, the wires to be connected are gathered and held and the soldering element are brought into contact with the gathered wires for the interconnection thereof.

Obviously, the three elements could be made to perform their respective functions by a provision whereby each would move obliquely of the wires, suitably moving forward and retracting to perform their functions with suitable timing mechanisms to operate the elements; the straight line movement disclosed herein being a simple schematic illustration for purposes of disclosure of the invention.

To explain in more detail how the connecting elements operate, attention is invited to the receptacle 36 used as a reservoir for the solvent. This container has a rotatable applicator wheel 50 mounted centrally thereof to extend upwardly beyond the top level of the solvent and rotatable by frictional engagement with the warp wires 18 as the receptacle is moved transversely of the warp wires to be connected so as to apply the solvent to the wires so as to soften the insulation which in the practical embodiment of the memory array is enamel.

The brushing mechanism 38 comprises a base 52 with a pair of upstanding arms 54 which hold the brush so that the latter may be rotated by any suitable means (not shown) so that the insulating enamel previously softened by the solvent can be removed from the wires. This brush 38 could, of course, be stationary and the brushing function accomplished by the element 52 as it is moved transverse of the wires; the rotating brush being described as one manner of performing the brushing operation.

The solder container 40 comprises an elongated reservoir having sufficient amount of solder 56 and shown in more detail in FIGURE 6. In this figure, it can be seen that the solder maintained in its molten state by suitable heater (not shown) is subject to vibration by means of a vibrator 58 of any suitable type attached to the container 40. This vibrator 58 sets up standing waves or ripples in the molten solder as illustrated schematically at 62. The purpose of providing standing waves is to separate unoxidized solder from oxidized solder so that clear, unoxidized solder is always applied to the wires and to secondly ensure that the crevices between the wires are filled with solder as they are held in place. In this manner, not only is it not necessary to bend the wires for the soldering operation, but a good connection is made without the application of flux to clean the solder and the wires.

It is to be noted that while the foregoing described a method of connecting the wires by soldering, it is within the scope of this invention to utilize other connection means and methods in conjunction with the clamping means, gathering comb, and heddle combination as described herein. For example, instead of soldering the wires together, the same could be flame welded and the latter could be accomplished whether or not the insulation is removed in accordance with current practice. More specifically, it would be a simple matter, once having understood the invention herein, to provide a flame-welding type device to sweep, as it were, a plurality of wires to be connected in a transverse motion with a pinpoint flame in an area immediately preceding the gathering comb and connect the contiguous wires by welding even without removing the insulation prior to the welding operation, leaving the welding device to remove the insulation at the time of making the weld.

Figure 7:
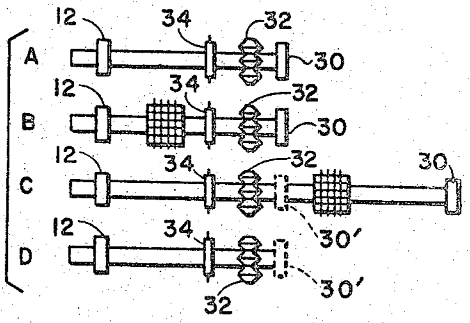
FIGURE 7 illustrates the various steps in performing this method in the apparatus disclosed.

FIGURE 7 shows the relationship of the matrix and the clamp as it operates to complete one matrix. The clamp 30 is moved from a position to the right of the comb 32, as shown in FIGURES A and B to a position to the extreme right, as in FIGURE C, where the same clamp shown in dotted lines and identified as 30′ is relocated. This relocation permits the matrix to be moved by cutting the warp wires and the weaving operation started again without the loss of control over the warp wires.

Figure 8:
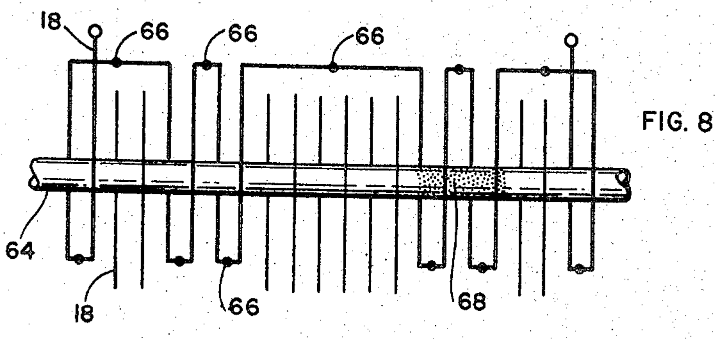
FIGURE 8 is a schematic illustration of the wires of the matrix woven and interconnected according to the teachings of the present invention.

Turning now to FIGURE 8, which is a schematic illustration of the matrix, it is to be noted that the insulated wires 18 are shown alternately woven over and under a single plated wire 64. Some of the wires are connected as schematically illustrated at 66 to show how a plurality of woven wires are connected as a single wire in the matrix. This figure also shows the complex array connected simply by the method and apparatus hereinabove described with buckling coils, spacer wires, and coils with a sufficient number of turns to induce the proper magnetic flux in the increment beneath each coil as for example at 68.

Turning again to FIGURE 4, attention is directed to the fact that the bucking coils, spacer wires, etc., are made by the selection of wires to be gathered in the gathering comb and that such selection is not limited to adjacent wires as can be seen in the middle notch of the gathering comb in this figure.

Other embodiments of the present invention and modifications of the embodiment herein presented may be developed without departing from the essential characteristics thereof. Accordingly, the invention should be limited only by the scope of the claims appended below.

What is claimed as new is:

1. Apparatus for electrically inner connecting selected ones of a plurality of wires for forming a memory for a computer comprising, in a weaving loom:

means for selecting predetermined ones of a plurality of electrically insulated warp wires arranged for a weaving operation;

a gathering means;

means for moving said selected warp wires into said gathering means, means for removing insulation from the gathered portions of the selected wires; and means for suitably interconnecting the stripped portions of the selected wires.

2. Apparatus as defined in claim 1 wherein said means for removing insulation from the wires includes:

a container means for holding a suitable insulation softening solvent;

an applicator wheel rotatably mounted to said container means; and means for moving said container means relative to the wires thereby causing said applicator wheel to rotatably contact the wires at the location where interconnections are to be made and apply the solvent to the insulation.

3. Apparatus, as defined in claim 2, wherein said means for removing insulation from the wires to be interconnected further includes:

brush means positionable for brushing the softened insulation from the wires.

4. Apparatus as defined in claim 1, wherein said gathering means comprises a comb having a plurality of inclined surfaces for directing the selected wires into contact with each other as said selected wires move into said comb.

5. Apparatus as defined in claim 4, wherein said means for suitably interconnecting the stripped portions of the selected wires comprises:

a solder reservoir containing a quantity of solder and positionable adjacent said gathered wires;

means for heating the solder in said reservoir to a molten state; and vibrating means for vibrating said molten solder, thereby causing a standing wave to be created in the molten solder for contacting the wires with the standing wave of solder to produce a good solder connection between the stripped portions of the selected wires.

References Cited

UNITED STATES PATENTS

| | | | |
|---|---|---|---|
| 1,726,623 | 9/1929 | Hollnagel | 81—9.51 X |
| 2,783,525 | 3/1957 | Scharf | 228—5 |
| 3,063,476 | 11/1962 | Roesler | 140—112 |
| 3,084,650 | 4/1963 | Johns | 228—37 X |
| 3,300,767 | 1/1967 | Davis et al. | |
| 3,303,983 | 2/1967 | Patrick et al. | 228—37 |
| 3,377,581 | 4/1968 | Boles et al. | 29—604 X |

JOHN F. CAMPBELL, Primary Examiner

D. C. REILEY, Assistant Examiner

U.S. Cl. X.R.

29—203, 604; 81—9.51; 228—37